United States Patent
Smith et al.

(10) Patent No.: US 9,459,780 B1
(45) Date of Patent: Oct. 4, 2016

(54) DOCUMENTING INTERACTIVE GRAPHICAL DESIGNS

(71) Applicant: Axure Software Solutions, Inc., San Diego, CA (US)

(72) Inventors: Martin Smith, San Diego, CA (US); Victor Hsu, San Diego, CA (US); Joon Tan, San Diego, CA (US)

(73) Assignee: Axure Software Solutions, Inc., San Diego, CA (US)

( * ) Notice: Subject to any disclaimer, the term of this patent is extended or adjusted under 35 U.S.C. 154(b) by 104 days.

(21) Appl. No.: 14/700,051

(22) Filed: Apr. 29, 2015

(51) Int. Cl.
  *G06F 11/34* (2006.01)
  *G06F 3/0484* (2013.01)
  *G06F 3/0482* (2013.01)

(52) U.S. Cl.
  CPC ......... *G06F 3/04845* (2013.01); *G06F 3/0482* (2013.01); *G06F 3/04842* (2013.01); *G06F 3/04847* (2013.01); *G06F 11/34* (2013.01)

(58) Field of Classification Search
  CPC ..................................................... G06F 11/34
  See application file for complete search history.

(56) References Cited

U.S. PATENT DOCUMENTS

| | | | |
|---|---|---|---|
| 5,581,682 A * | 12/1996 | Anderson et al. | 715/236 |
| 6,237,138 B1 * | 5/2001 | Hameluck et al. | 717/128 |
| 6,606,105 B1 * | 8/2003 | Quartetti | 715/853 |
| 7,139,978 B2 | 11/2006 | Rojewski et al. | |
| 7,788,647 B2 | 8/2010 | Martin et al. | |
| 7,934,158 B2 | 4/2011 | McLean | |
| 7,941,525 B1 | 5/2011 | Yavilevich | |
| 8,402,434 B2 | 3/2013 | McLean | |
| 8,762,836 B1 | 6/2014 | Hsu et al. | |
| 8,880,999 B1 | 11/2014 | Hsu et al. | |
| 8,881,109 B1 | 11/2014 | Bridges et al. | |
| 8,938,679 B1 | 1/2015 | Hsu et al. | |
| 2005/0144595 A1 | 6/2005 | McLean | |
| 2008/0034117 A1 * | 2/2008 | Lemay et al. | 709/245 |
| 2008/0229332 A1 * | 9/2008 | Lloyd et al. | 719/318 |
| 2011/0202933 A1 | 8/2011 | Sherrill | |
| 2011/0307863 A1 | 12/2011 | Malnati | |
| 2011/0314343 A1 * | 12/2011 | Hoke et al. | 714/45 |
| 2013/0227350 A1 * | 8/2013 | O'Riordan et al. | 714/45 |

(Continued)

OTHER PUBLICATIONS

Adobe, "InDesign Help / Managing graphics links," Jul. 12, 2014, https://web.archive.org/web/20140712000203/http://helpx.adobe.com/indesign/using/graphics-links.html.*
Notable—Better Interfaces Through Faster Iterations, http://notableapp.com/tour, Accessed on Feb. 23, 2015, 10 pages.
Solidify, Quick way to build prototypes for user testing, http://www.solidifyapp.com/tour, Accessed on Feb. 23, 2015, 10 pages.
Wireframng Tool, ProtoShare, http://www.protoshare.com/features/, Accessed on Feb. 23, 2015, 5 pages.

*Primary Examiner* — Ryan Barrett
(74) *Attorney, Agent, or Firm* — The Mueller Law Office, P.C.

(57) ABSTRACT

Examples of systems and methods for documenting an interactive graphical design address the need to document interactive graphical designs automatically and efficiently without requiring substantial manual time and effort. These examples are operable to automatically generate documentation based on data collected from an interaction session of a user with the interactive graphical design without any additional user input. The documentation is populated automatically with descriptive text and images of the interactive graphical design. Some examples also provide tools for editing the documentation. Examples of these tools include tools for removing portions of the documentation on the basis of events that occurred during the interaction session, and tools for customizing the content and appearance of the documentation. In addition, some examples are operable to update the documentation automatically to reflect modifications to the interactive graphical design.

18 Claims, 6 Drawing Sheets

(56) References Cited

U.S. PATENT DOCUMENTS

| | | |
|---|---|---|
| 2013/0304906 A1 | 11/2013 | Yavilevich et al. |
| 2014/0019937 A1 | 1/2014 | Clark et al. |
| 2014/0095979 A1* | 4/2014 | Meckler ............... G06F 17/2247 715/234 |
| 2014/0108911 A1* | 4/2014 | Damale ................... H04L 67/22 715/234 |
| 2014/0181705 A1* | 6/2014 | Hey .................... G06F 11/3672 715/764 |
| 2014/0337767 A1 | 11/2014 | Hsu et al. |
| 2015/0020052 A1 | 1/2015 | Saar et al. |
| 2015/0089467 A1* | 3/2015 | Hsu et al. ...................... 717/105 |
| 2015/0143270 A1* | 5/2015 | Hsu et al. ...................... 715/763 |
| 2015/0286355 A1* | 10/2015 | Prasad ................ G06F 11/3668 715/763 |

\* cited by examiner

Documentation for Recording 1 102

1. Start on Page 1

Something
$10.00
Quantity: 2
Add to Cart

My Cart: 0 Items

2. Click Add to Cart

Shopping Cart
< Continue Shopping

| Item Description | Price | Quantity | Total |
|---|---|---|---|
| Something SKU12345 | $10.00 | 2 remove | $20.00 |

Update Cart   Sub-total: $20.00
Checkout >

1 item in your cart 120
122

Structural Editor 124

Recording 127

Start on Page 1

Click Add to Cart
  128 ✓ Don't Include
  Open Page 2

Click Check Out
  Open Page 3

Graphical Tools 126

DOCUMENTING INTERACTIVE GRAPHICAL DESIGNS

BACKGROUND

Throughout the software development process, before and after the software reaches production, it is necessary to create documentation to communicate the use, administration, and interfaces of the software with the development team, stakeholders, and end users. Manual creation of software documentation is difficult, time consuming, and expensive. Automated software documentation systems typically execute test scripts to run software applications through particular operational scenarios. One exemplary automated documentation system produces natural language textual descriptions of graphical user interface (GUI) object activity during the script-based execution of the software; the textual descriptions then are combined with screenshots of the graphical user interface that are captured manually during playback of the script to produce documentation for the software. Another exemplary automated documentation system updates existing software documentation using test scripts that include tags at locations in the test script that trigger the capture of respective screenshots of the software GUI at particular times during the execution of the test script; the screenshots then are incorporated into the documentation at designated locations that correlate with the tags in the test script.

SUMMARY

In one embodiment, a computer-implemented method is provided. Each step of the method is conducted using a processor and a memory. The method comprises the steps of recording a sequence of events occurring in the interaction session during an interaction session of a user with an interactive graphical design. The method also comprises automatically generating a first set of images of the interactive graphical design. Each of the images in the first set of images represents a state of the interactive graphical design following a respective one of the events. The method also comprises producing documentation for the interactive graphical design comprising an arrangement of descriptions of respective ones of the events ordered according to the recorded event sequence and respective ones of the images from the first set. The method also comprises automatically creating a second set of images of a modified version of the interactive graphical design based on the recording. The method also comprises automatically updating respective ones of the images from the first set with corresponding ones of the images from the second set to provide updated documentation in the documentation for the interactive graphical design.

In another embodiment, at least one non-transitory computer-readable medium having computer-readable program code embodied therein is provided. The computer-readable program code, when executed by computer apparatus, causes the computer apparatus to perform operations. The operations include recording a sequence of events occurring in the interaction session during an interaction session of a user with an interactive graphical design. The operations also include automatically generating a first set of images of the interactive graphical design. Each of the images in the first set of images represents a state of the interactive graphical design following a respective one of the events. The operations also include producing documentation for the interactive graphical design comprising an arrangement of descriptions of respective ones of the events ordered according to the recorded event sequence and respective ones of the images from the first set. The operations also include automatically creating a second set of images of a modified version of the interactive graphical design based on the recording. The operations also include automatically updating respective ones of the images from the first set with corresponding ones of the images from the second set to provide updated documentation in the documentation for the interactive graphical design.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The examples that are described herein provide improved systems and methods for documenting an interactive graphical design by solving practical problems that have arisen as a result of the need to document interactive graphical designs automatically and efficiently without requiring substantial manual time and effort.

These systems and methods are operable to automatically generate documentation based on data collected from an interaction session of a user with the interactive graphical design without any additional user input. The documentation is populated automatically with descriptive text and images of the interactive graphical design without requiring text that has been pre-scripted by a script designer or screen capture triggering tags embedded in test scripts. Some examples also provide tools for editing the documentation. Examples of these tools include tools for removing portions of the documentation on the basis of events that occurred during the interaction session, and tools for customizing the content and appearance of the documentation. In addition, some examples are operable to update the documentation automatically to reflect modifications to the interactive graphical design.

In specific examples, these systems and methods include improved special purpose computer apparatus programmed to automatically document interactive graphical designs based on live interaction sessions of users with the interactive graphical designs and to automatically update the documentation to reflect modifications to the interactive graphical designs.

Figure 1A:
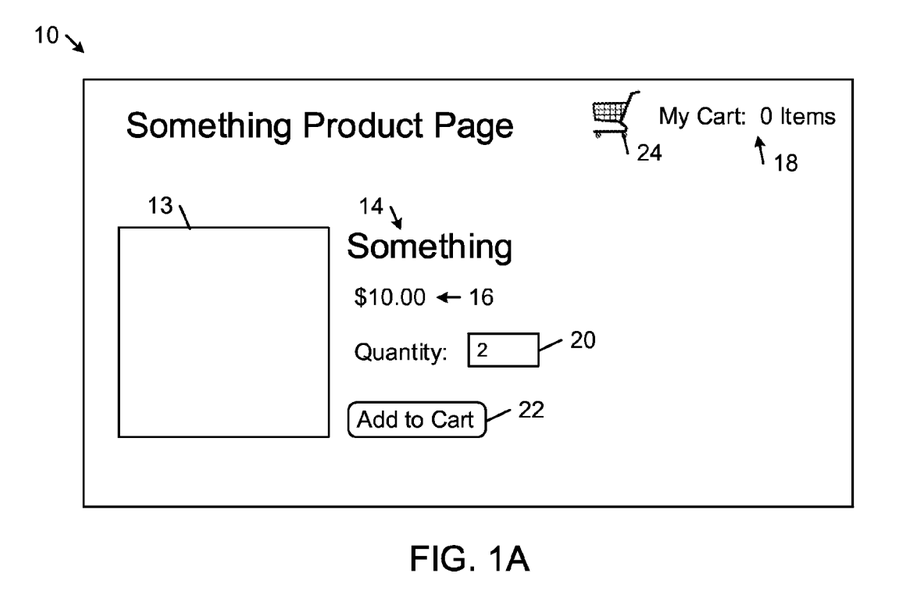
FIG. 1A is a diagrammatic view of an example of a GUI page of an interactive graphical design.
Figure 1B:
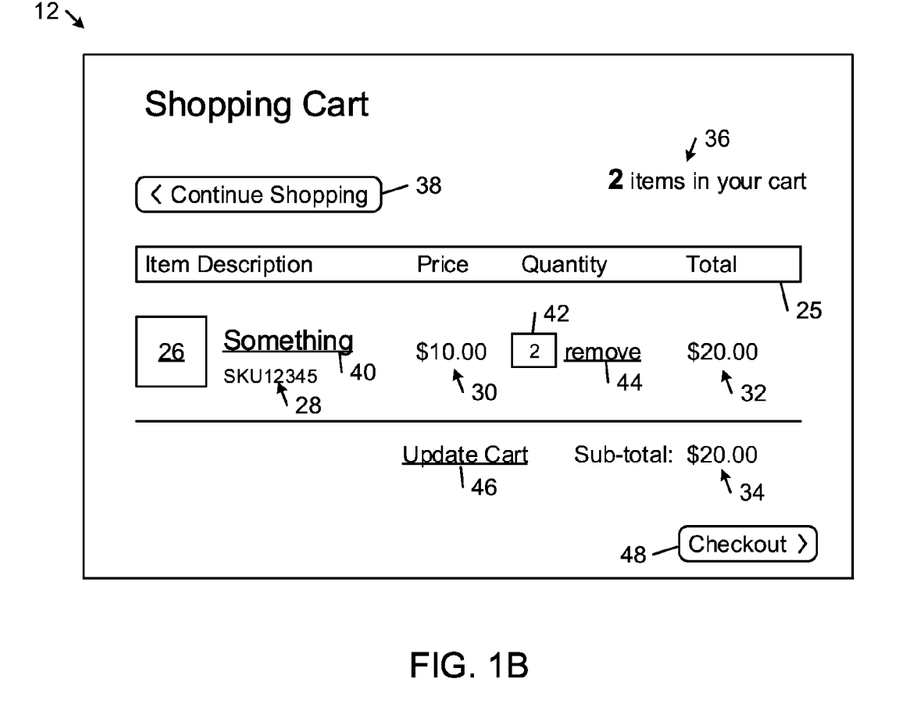
FIG. 1B is a diagrammatic view of another example of a GUI page of the interactive graphical design.

FIGS. 1A and 1B respectively show examples of a product web page 10 and a shopping cart web page 12 that are generated according to an example of an interactive graphical design that controls the operation of a user's computer system to provide graphical user interfaces for shopping online. In these examples, the interactive graphical design is embodied in specific computer-readable instructions that programmatically control the operation of the user's computer system to provide particular online shopping functionality. In some examples, a design tool encodes the interactive graphical design into a set of instructions that are executable by the user's computer system or an application running on the user's computing system to generate interfaces of the interactive graphical design that are responsive to user input. In some of these examples, the design tool encodes the interactive graphical design into a combination of HyperText Markup Language (HTML) and JavaScript instructions that are embedded in one or more web pages that can be downloaded from a web site by a web browser (e.g., the Google Chrome browser, the Microsoft Internet Explorer browser, and the Apple Safari browser) being executed by the user's computer system. The downloaded web pages typically are stored in one or more non-transitory computer-readable media that are accessible by the user's computer system. The graphical user interfaces of the web pages typically are displayed through a Document Object Model (DOM) Application Programming Interface (API) of the web browser.

The product web page 10 shown in FIG. 1A includes passive elements and interactive elements. The passive elements include a product image 13, a product name 14, a product price 16, and a shopping cart summary 18. The interactive elements include a product quantity input box 20, an Add to Cart button 22, and a shopping cart icon 24. The quantity input box 20 allows the user to enter a desired quantity of the product to purchase. Selection of the Add to Cart Button 22 causes the web browser to instruct the web site to add the indicated quantity of the product to the user's shopping cart and, in response, the web site sends the web browser the shopping cart web page 12 to display. Selection of the shopping cart icon 24 causes the web browser to report the selection to the web site and, in response, the web site sends the web browser the shopping cart web page 12 to display.

The shopping cart web page 12 shown in FIG. 1B also includes passive elements and interactive elements. The passive elements include a purchase summary table header 25, a product image 26, a product identifier 28, a product price 30, a sub-total purchase amount 32, a total purchase amount 34, and a shopping cart quantity summary 36. The active elements include a Continue Shopping button 38, a product link 40, a quantity input box 42, a remove product link 44, an Update Cart link 46, and a Checkout button 48. Selection of the Continue Shopping button 38 causes the web browser to report the selection to the web site and, in response, the web site sends the web browser a designated shopping landing page to display. Selection of the product link 40 causes the web browser to report the selection to the web site and, in response, the web site sends the web browser the web page for the product to display. The quantity input box 42 allows the user to modify the quantity of the product to purchase. Selection of the remove product link 40 causes the web browser to instruct the web site to remove the product from the user's shopping cart and update the shopping cart page 12. Selection of the Update Cart link 46 causes the web browser to report the selection to the web site and, in response, the web site sends the web browser an updated shopping cart page 12 to display. Selection of the Checkout button 48 causes the web browser to report the selection to the web site and, in response, the web site sends the web browser a checkout web page (not shown) to display.

During a user interaction session with the web site, the user may provide a variety of user inputs that manipulate the computer system to perform a series of user interface actions with respect to the web pages retrieved from the website. Examples of such user inputs include activating a link (e.g., by mouse over or selection), selecting a button, moving a mouse cursor over a display area, moving or resizing a user interface window, inputting text via a keyboard, and speaking voice commands into a microphone. The user's computer system is configured to detect particular ones of the user inputs and certain occurrences (e.g., changes in the state of the GUI) as "events." In some examples, the user's computer system includes software routines referred to as "event handlers" that are attached to applications to monitor events and perform actions in response to respective types of events. Examples of such actions include providing information (e.g., mouse and keyboard information or design variable values) to the attached applications, shifting design focus, hiding elements, showing elements, moving elements, scrolling a window, linking to a different page or chapter of a design, and selecting menu elements.

In some examples, the user's computer system is configured to record a sequence of the user inputs received during the user interaction session with the web site. For each user input, the recorded information may include a timestamp, an identifier of the user input, and other data associated with the user input. In some examples, the user's computer system executes a user interface monitor to record the user's inputs. The user interface monitor may be a component of the web browser or it may be a separate application (e.g., a JavaScript application) that is executed by the web browser. In some examples, the user's computer system also records information regarding the event handlers that respond to the events that are detected during the user interaction session. Examples of the types of event handler information that may be recorded for each activated event handler include an identifier of the event handler and the action performed by the event handler. In some examples, the recorded information includes data that defines a sequence of the current states of the interface over time, such as current variable values (e.g., values input into fields), window size, adaptive view information, and menu selections. In addition to user actions, some examples also record network transactions between the user's computer system and the web site (e.g., requests by the user's computer system and responses from the web site).

Figure 2:
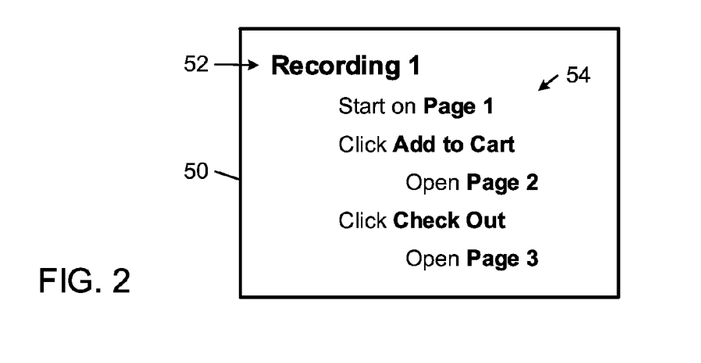
FIG. 2 is a schematic view of an example of a recording of GUI activity in connection with the GUI pages shown in FIGS. 1A and 1B.

FIG. 2 shows a schematic example of a recording 50 that is generated during a user interaction session with the GUI pages 10, 12 that are respectively shown in FIGS. 1A and 1B. The recording 50 includes a recording title 52 and a list 54 of events and event handler actions that are ordered by timestamp. In the example shown in FIG. 2, the events list 54 documents the following series of user interface events and event handler triggered web browser actions:

1. the user's computer system displaying the product page 10 (identified as Page 1);
2. the user clicking the Add to Cart button 22 on the product page 10;
3. the user's computer system opening the Shopping Cart page 12 (identified as Page 2) in response to the user clicking the Add to Cart button 22;
4. the user clicking the Check Out button 48 on the shopping cart page 12; and
5. the user's computer system opening a check out page (identified as Page 3) in response to the user clicking the Check Out button 48.

As explained above and described in detail below, the examples that are disclosed herein are able to generate documentation based on data collected from an interaction session of a user with the interactive graphical design without any additional user input. The documentation may be generated directly from the live interaction session or from a recording of the live interaction session. These examples automatically populate the documentation with descriptive text and images of the interactive graphical design without requiring text that has been pre-scripted by a script designer or screen capture triggering tags embedded in test scripts.

Figure 3:
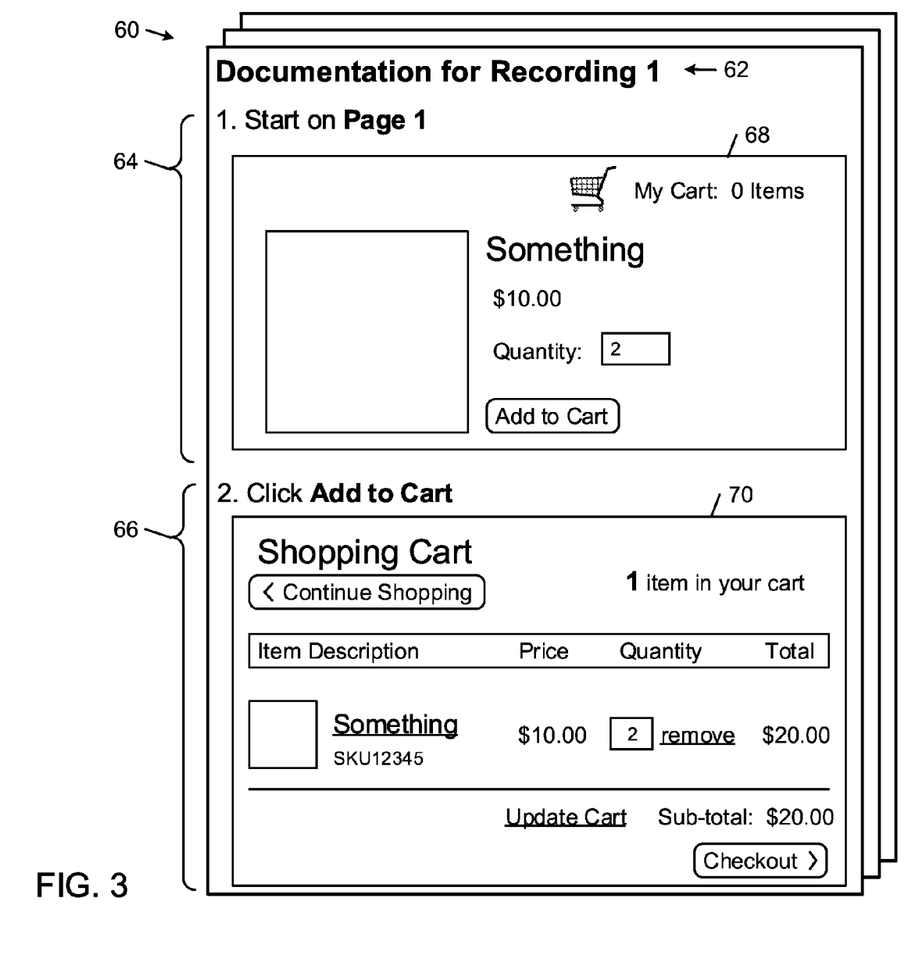
FIG. 3 is a diagrammatic view of an example of documentation that is generated during an interaction session of a user with the GUI pages shown in FIGS. 1A and 1B.

FIG. 3 shows an example of documentation 60 that is generated based on data collected from an interaction session of a user with the product and shopping cart GUI pages 10, 12 shown in FIGS. 1A and 1B. The documentation 60 includes a title 62 and sections 64, 66 that correspond to respective ones of the events that occurred during the interaction session. In the illustrated example, section 64 corresponds to the first event in the recording 50, and section 66 corresponds to the second event in the recording 50. The description recorded for each event is used as a heading for each section. In the illustrated example, the heading of the first section 64 in the documentation 60 is the recorded description of the first event in the recording 50 (i.e., "Start on Page 1"), and the heading of the second section 66 in the documentation 60 is the recorded description of the second event in the recording 50 (i.e., "Click Add to Cart").

Each section 64, 66 also includes a respective image 68, 70 of the interactive graphical design following the respective event. In the illustrated example, the image 68 in the first section 64 of the documentation 60 shows the interactive graphical design in a state resulting from the occurrence the first event in the recording 60. In the illustrated example, the resulting state corresponds to a particular state of the product web page 10. Similarly, the image 70 in the second section 66 of the documentation 60 shows the interactive graphical design in the state resulting from the occurrence of the second event in the recording 60. In the illustrated example, the resulting state corresponds to a particular state of the shopping cart web page 12.

As explained in detail below, the images 68, 70 may be screenshots of the interactive graphical design that are captured during a live interaction session of the user with the interactive graphical design. Alternatively, the images 68, 70 may be images of the interactive graphical design that are generated during a playback of a recording of the live interaction session with respect to the interactive graphical design. In this regard, the sequence of events in the recording is input into the interactive graphical design to run the interactive graphical design through a corresponding sequence of interface states that can be captured as images 68, 70. In some examples, the images 68, 70 are displayed on a display device and captured as screenshots. In other examples, a rendering engine may generate the images 68, 70 directly from a playback of a recording of the live interaction session and the interactive graphical design without having to retrieve the images from image buffers storing display versions of the product and shopping cart web pages 10, 12.

Figure 4:
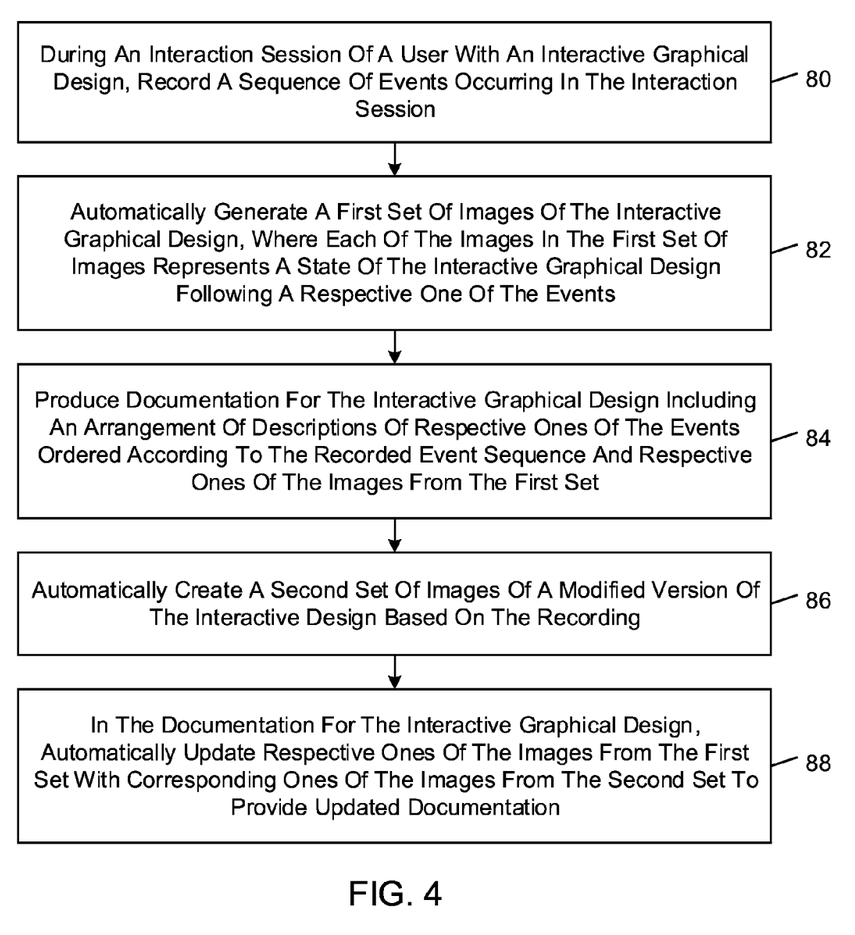
FIG. 4 is a flow diagram of an example of a method of documenting interactive graphical designs.

FIG. 4 shows an example of a method of documenting an interactive graphical design. In this example, documentation is generated based on data collected from an interaction session of a user with an interactive graphical design and the documentation is updated automatically to reflect subsequent modifications to the interactive graphical design.

In accordance with the method of FIG. 4, a sequence of events occurring in an interaction session of a user with an interactive graphical design is recorded (FIG. 4, block 80). A first set of images of the interactive graphical design is generated automatically, where each of the images in the first set of images represents a state of the interactive graphical design following a respective one of the events (FIG. 4, block 82). Documentation for the interactive graphical design is produced (FIG. 4, block 84). The documentation includes an arrangement of descriptions of respective ones of the events ordered according to the recorded event sequence and respective ones of the images from the first set. A second set of images of a modified version of the interactive graphical design is automatically created based on the recording (FIG. 4, block 86). The modified version of the interactive graphical design can be specified by a designer using a design tool to improve or otherwise modify the design that was used to generate the recording. In the documentation for the interactive graphical design, respective ones of the images from the first set are automatically updated with corresponding ones of the images from the second set to provide updated documentation (FIG. 4, block 88).

In general, the documentation may be stored in a wide variety of different formats, including, portable document format, rich text document format (RTF), HTML, XML (Extensible Markup Language), or other markup languages.

In some examples, the descriptions of respective ones of the events also are recorded during the interaction session. In some examples, descriptions of actions following respective ones of the events are recorded, and the production of the documentation includes incorporating descriptions of respective ones of the actions in the documentation. In some examples, data may be incorporated into the documentation from sources other than the recording. For example, in some cases, descriptions of the actions are added to the documentation based on data stored in the design. In some of these examples, the event handlers are associated with descriptions of the actions they perform, and the documentation system extracts the action descriptions from the design data as the documentation is being constructed.

In some examples, the first set of images is generated automatically during the interaction session. In other examples, the first set of images is generated during a playback of the recorded interaction session. In some examples, a respective image of the interactive graphical design is automatically generated for each recorded event in the interaction session which alters the appearance of the interactive graphical design.

In some examples, the second set of images is created automatically while the recording is being played with respect to the modified version of the interactive graphical design.

In some examples, the production of the documentation involves identifying which of the images to exclude from the documentation based on user input, and automatically modifying the layout to produce the documentation without the identified images. In some of these examples, the identification process includes determining which of the events to exclude from the documentation based on user input and automatically identifying ones of the images corresponding to the determined events as the images to exclude from the documentation.

In some examples, the production of the documentation involves automatically creating a presentation of descriptions of the events and the images in the layout, receiving user input specifying one or more configuration options, and modifying the presentation according to the one or more specified configuration options to produce the documentation for the interactive graphical design.

In some of these examples, the process of updating the images to reflect the modified version of the interactive graphical design involves applying at least one of the one or more specified configuration options to the updated documentation. At least one of the specified configuration options may be a modification that is applied to a particular one of the images (e.g., a transformation of the particular image), and the process of updating that images in the documentation involves applying the modification with respect to the updated version of the particular image.

Some examples provide a user interface showing a graphical representation of the documentation, a list comprising respective ones of the event descriptions, and user-selectable configuration options for modifying the documentation. In some of these examples, the user-selectable configuration options include controls for designating respective ones of the event descriptions to exclude from the documentation, where the event description designated by a particular control is removed from the documentation in response to user-selection of the particular control.

In some examples, each description in the arrangement of descriptions of respective ones of the events in the documentation is generated automatically based on at least one user input to a design tool that is used to generate the interactive graphical design.

Examples of systems for generating documentation for interactive graphical designs are described below.

Figure 5A:
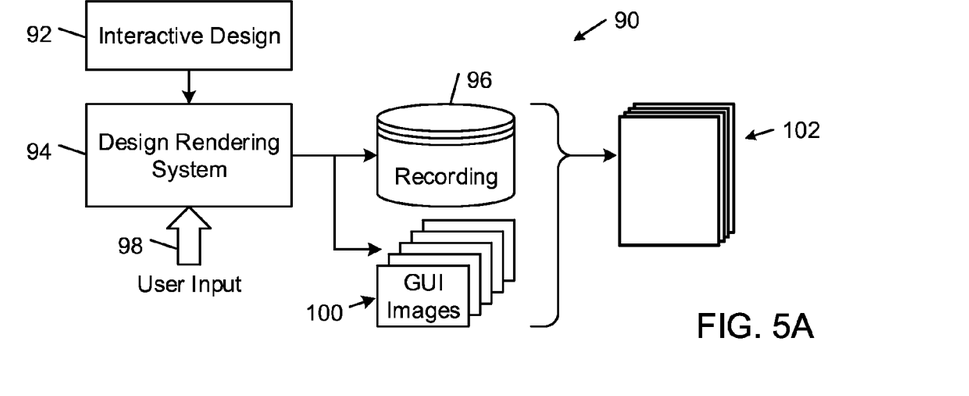
FIG. 5A is a diagrammatic view of an example of a system for recording an interaction session of a user with an interactive graphical design and capturing images of the interactive graphical design during the interaction session.

FIG. 5A shows an example of a system 90 for recording an interaction session of a user with the interactive graphical design 92 and concurrently capturing images of the interactive graphical design 92. The system 90 includes a design rendering system 94 that allows the user to interact with the interactive graphical design 92 by supplying inputs 98 to the design rendering system 94. During the interaction session, the rendering system 94 produces a recording 96 of a time-stamped sequence of identifiers and descriptions of events (and optionally event handler actions) that occur in the interaction session. The design rendering system 94 also generates images 100 of the graphical user interfaces that are generated by the design rendering system 94 during the interaction session in accordance with the interactive graphical design 92 and the user inputs 98. As explained in detail below, the recording 96 and the GUI images 100 are used to create the documentation 102 for the interactive graphical design 92.

Figure 5B:
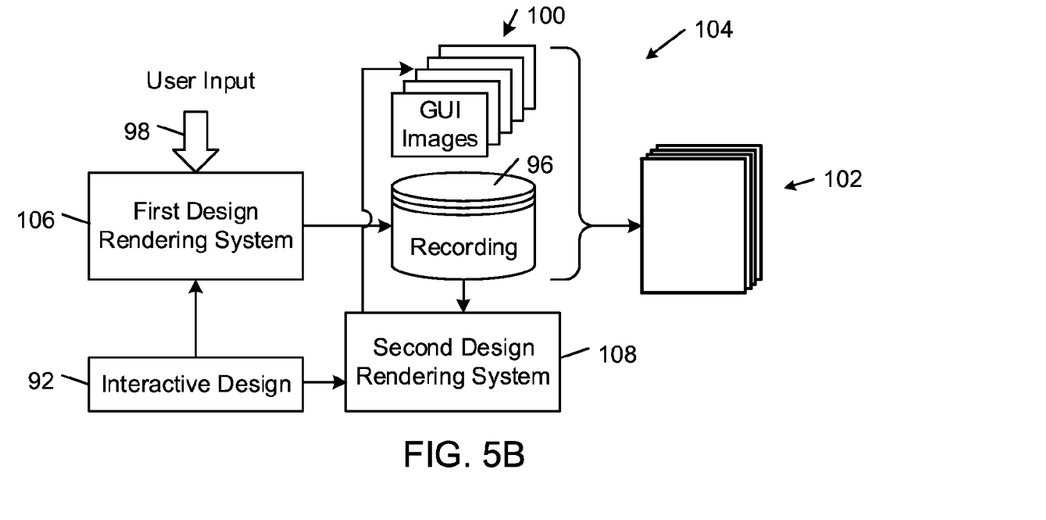
FIG. 5B is a diagrammatic view of an example of a system for recording an interaction session of a user with an interactive graphical design and capturing images of the interactive graphical design during the interaction session.

FIG. 5B shows an example of another system 104 for recording an interaction session of a user with the interactive graphical design 92 and capturing images of the interactive graphical design 92. In this example, a first design rendering system 106 records an interaction session of a user with the interactive graphical design 92. Based on the recording 96, a second design rendering system 108 generates GUI images 100 of the interactive graphical design 92. In this regard, the second design rendering system 108 plays the recording 96 with respect to the interactive graphical design 92 to generate the GUI images 100 of the interactive graphical design 92. In some examples, the second design rendering system 108 generates display images of the interactive graphical design 92 and captures the GUI images 100 as screenshots. In other examples, the second design rendering system 108 renders the GUI images 100 directly from a playback of the recording of the live interaction session and the interactive graphical design 92 without having to retrieve the images from image buffers storing display versions of the interactive graphical design interface states. The second design rendering system 108 may generate the GUI images 100 either while the recording 96 is being produced by the first design rendering system 106 or after the recording 96 has been completed. As explained in detail below, the recording 96 and the GUI images 100 are used to create the documentation 102 for the interactive graphical design 92.

Figure 5C:
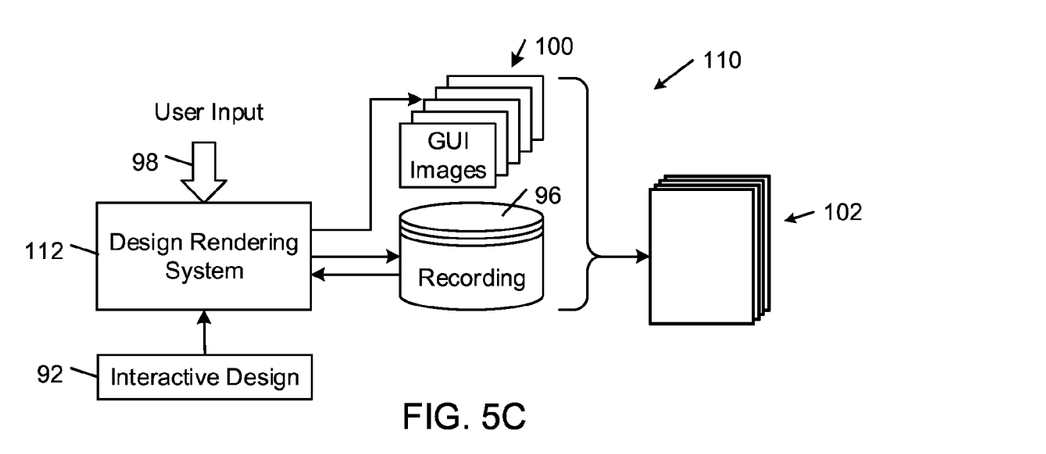
FIG. 5C is a diagrammatic view of an example of a system for recording an interaction session of a user with an interactive graphical design and capturing images of the interactive graphical design during the interaction session

FIG. 5C shows an example of another system 110 for recording an interaction session of a user with the interactive graphical design 92 and capturing images of the interactive graphical design 92. This example corresponds to the system 104 shown in FIG. 5B, except that the respective functions performed by the first and second design rendering systems 106, 108 are performed by a single design rendering system 112. The design rendering system 112 may generate the GUI images 100 either while the recording 96 is being produced or after the recording 96 has been completed.

Figure 6:
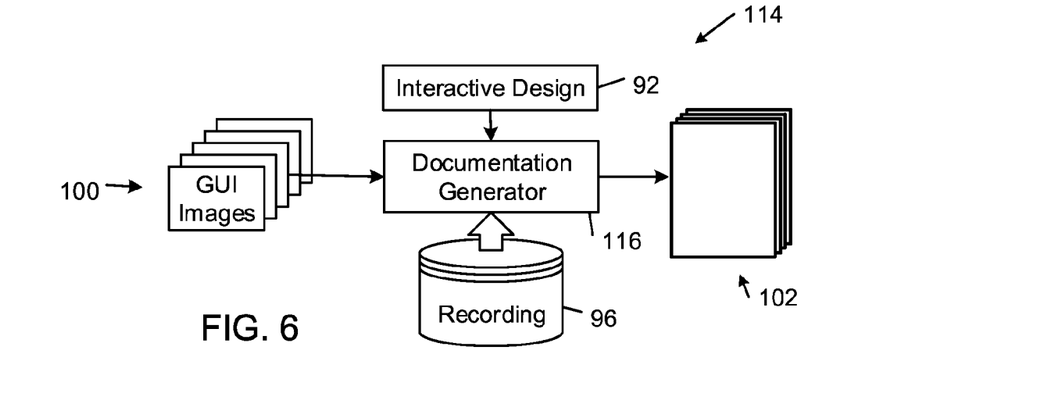
FIG. 6 is a diagrammatic view of an example of a system for generating documentation for an interactive graphical design.

FIG. 6 shows an example of a system 114 for generating documentation 102 for an interactive graphical design 92. The system 114 includes a documentation generator 116 that automatically creates the documentation 102 with descriptive text and images of the interactive graphical design without requiring text that has been pre-scripted by a script designer or screen capture triggering tags embedded in test scripts. In some examples, the documentation generator 116 identifies the name of the recording and creates a page of the documentation 102 with a title that corresponds to the identified recording name. The documentation generator 116 also identifies events (and optionally event handler actions) in the recording 96, extracts identifiers and other descriptive text corresponding to the identified events, and automatically creates a respective section header in the documentation for each of the identified events. For each event, the documentation generator 116 also either generates, or identifies one or more of the GUI images 100 that correspond to the event and automatically inserts the one or more GUI images 100 in the section corresponding to the event. FIG. 3 shows a schematic example of documentation 60 that may be generated by the documentation generator 116.

Some examples provide tools for editing the documentation 102, including tools for removing portions of the documentation 102 on the basis of events that occurred during the interaction session, as well as tools for customizing the content and appearance of the documentation 102.

Figure 7:
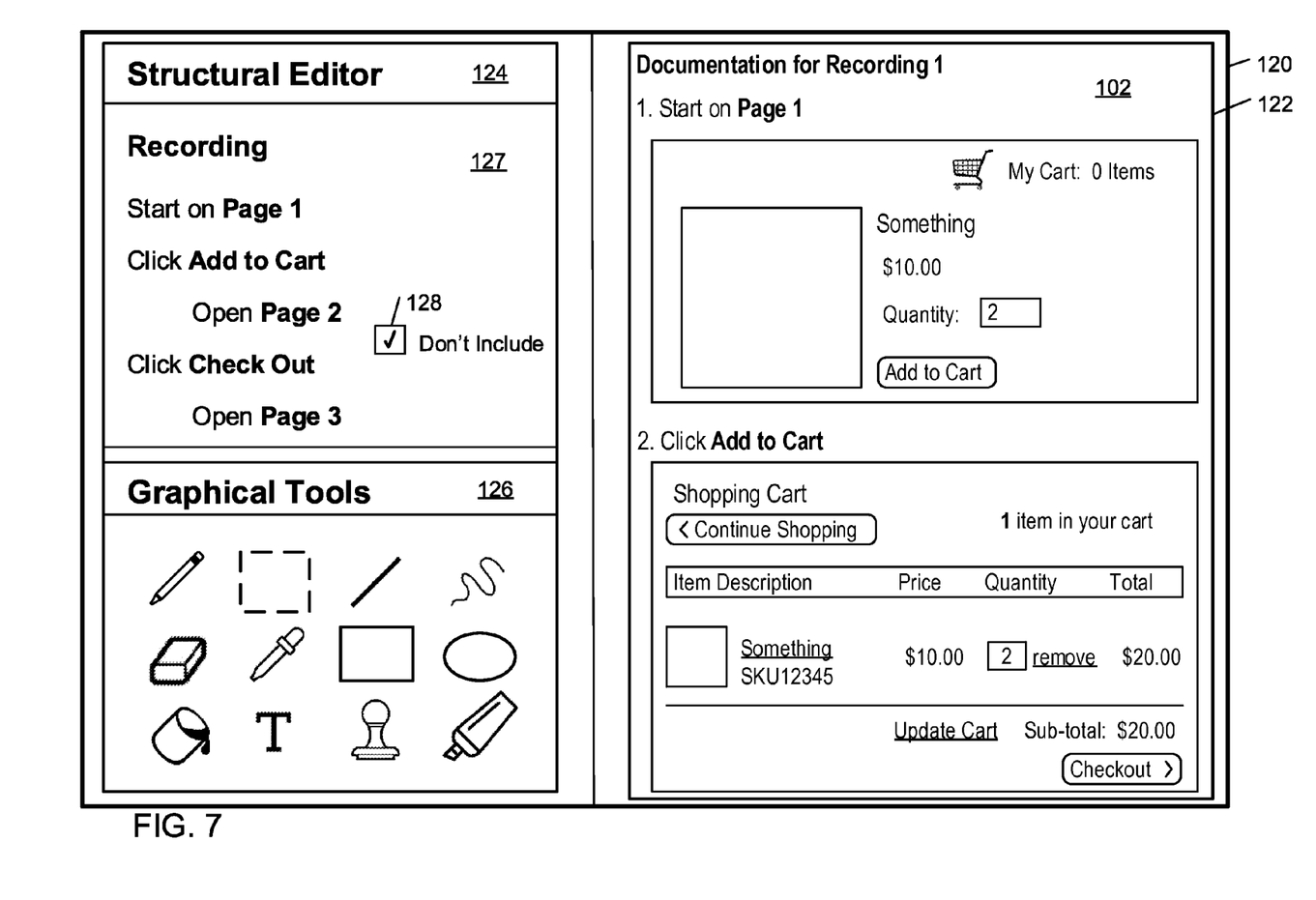
FIG. 7 is a diagrammatic view of an example of a documentation editing interface.

FIG. 7 shows an example of a documentation editing interface 120 that includes a documentation pane 122 for displaying pages of the documentation 102, a structural editor pane 124 for editing the documentation 102 on a section-by-section basis, and a graphical tools pane 126 that includes graphical tools for graphically modifying the pages of the documentation 102 displayed in the documentation pane.

The structural editor pane 124 includes an event section 127 that shows an editable list of recorded events (and optionally event handler actions) that are ordered by timestamp. The documentation editing interface 120 provides tools for removing portions of the documentation 102 on the basis of events that occurred during the interaction session. In some example, for each event listed in the structural editor pane 124, the documentation editing interface 120 provides a respective control that allows the user to indicate whether or not to include the corresponding section in the documentation 102. In the illustrated example, a checkbox 128 appears when the user manipulates an input device to mouse-over a region of the structural editor panel 124 that is adjacent to a particular one of the listed events. In response to the user checking the checkbox 128, the color of the textual description of the event changes (e.g., from black to red) to indicate that it has been removed from the documentation and the corresponding section in the documentation 102 is deleted. In the illustrated example, the checkbox 128 adjacent to the Click Check Out event is checked. This is interpreted by the documentation generator as an instruction to exclude the section corresponding to the Click Check Out event and any associated event handler actions (e.g., Open Page 3) from the documentation. The user may uncheck the checkbox 128 to reincorporate the removed section back into the documentation 102.

The graphical tools pane 126 includes tools for customizing the content and appearance of the documentation. The illustrated example shows a set of image editing tools, including a pencil tool, an eraser tool, a paint bucket tool, a select tool, an eyedropper tool, a text tool, a line tool, a rectangle tool, a stamp tool, a freeform pen tool, an ellipse tool, and a highlighter tool. The user may select these tools to overlay graphical customizations on the pages of the documentation that are shown in the documentation pane 122.

The structural edits and graphical customizations that are made by the user are stored in computer-readable memory in association with the documentation 102. These modifications to the documentation 102 may be used in rendering the documentation and in updating the documentation to reflect changes to the interactive graphical design.

As explained above, some examples are operable to update the documentation automatically to reflect modifications to the interactive graphical design without changing the usage scenario embodied in the recording of the user's live interaction session with the original interactive graphical design. Examples of the types of modifications that might be made to the interactive graphical design include one or more of removal of features, addition of new features, error corrections, reconfigurations, and other modifications.

Figure 8:
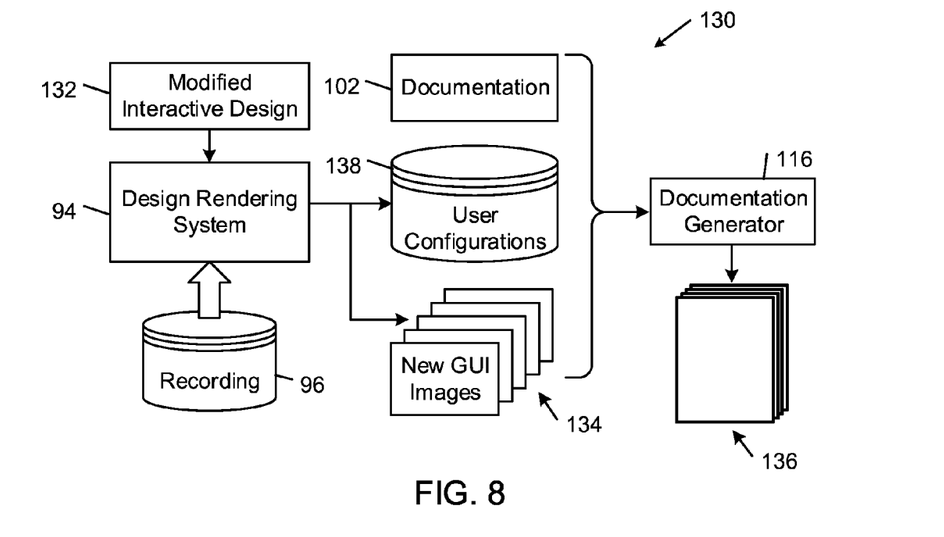
FIG. 8 is a diagrammatic view of an example of a system for updating documentation for an interactive graphical design.

FIG. 8 shows an example of a system 130 for updating the documentation 102 for an original interactive graphical design 92 to reflect changes that are embodied in a modified interactive graphical design 132. In this example, the design rendering system 94 plays the recording 96 of the user's interaction session with the original unmodified version of the interactive graphical design 92 with respect to the modified interactive graphical design 132. During the playback, the design rendering system 94 generates a new set of GUI images 134 of the modified interactive graphical design 132. In some examples, the design rendering system 94 generates display images of the modified interactive graphical design 132 and captures the new GUI images 134 as screenshots. In other examples, the design rendering engine 94 may generate the new GUI images 134 directly from the playback of the recording 96 and the modified interactive graphical design 132 without having to retrieve the images from image buffers storing display versions of the modified interactive graphical design interfaces.

Updated documentation 136 is produced from the original documentation 102, the new GUI images 134, and the user configurations 138 associated with the original documentation 102. In some examples, the documentation generator 116 (FIG. 6) identifies sections in the original documentation 102. For each section, the documentation generator 116 identifies one or more of the new GUI images 134 and user configurations 138 that correspond to the section and automatically replaces any images in the original documentation 102 with the one or more identified new GUI images 134. The documentation generator also automatically applies the identified user configurations. The user configurations can include any information applied in structural editor 124 regarding the content of the documentation that were applied prior to the modification of the design. As long as the design is not modified in a manner that removes an event or event handler action from the recording, the user configurations will generally still apply to the documentation when it is altered for the modified design. The user configurations can also include changes made to the screenshots using the graphical tools 126. Since the additions to the screenshots on a different layer of the documentation they can be overlain on the modified versions of the screenshots and still serve the purpose for which they were originally intended. Slight changes to these user configurations may be required to align them with the screenshots generated for the modified design.

Figure 9:
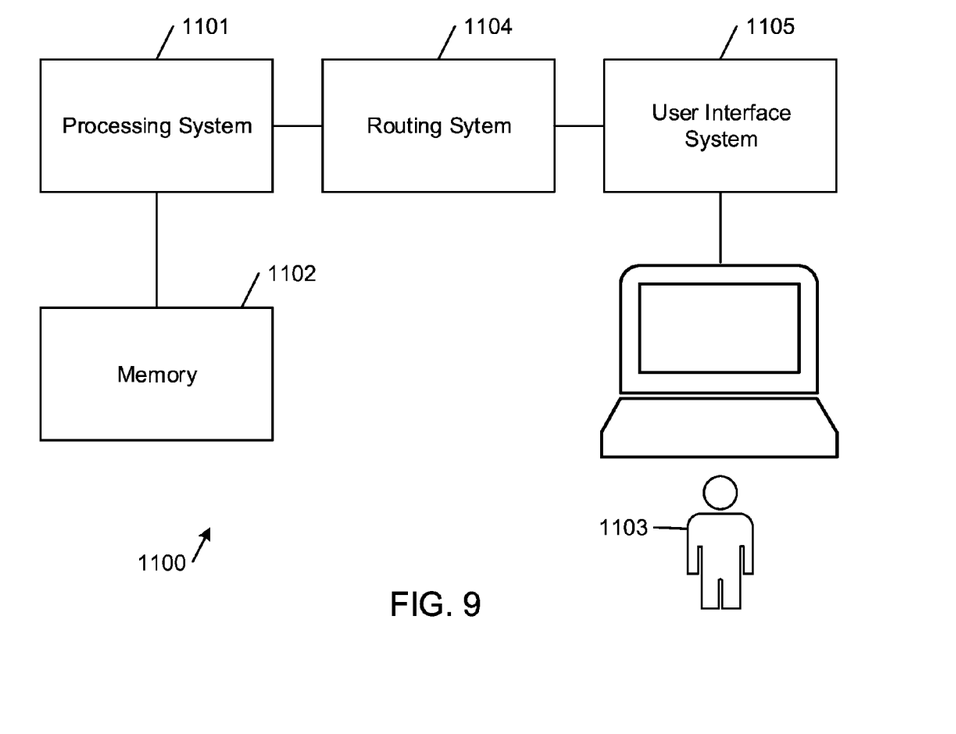
FIG. 9 is a diagrammatic view of a computer system.

Any of the methods described herein can be conducted through the use of a computer system 1100 as shown in FIG. 9. For example, the design environment could be provided by a processing system 1101 acting in tandem with a memory 1102. A user 1103 would be able to access the design environment through the use of a routing system 1104 and a user interface system 1105. Any method steps involving providing or accepting things to and from a user can be conducted using interface system 1105. Any method steps involving executing an action can be conducted using processing system 1101 alone or in combination with memory 1102. FIG. 9 is only an illustrative computer system that is amenable to operation in accordance with embodiments of the present invention and variant computer system topologies may be used in its stead. Nothing in this description should limit the processor of processing system 1101 to a single processor, as the function of this block can be accomplished by multiple physical processors located either on a single workstation or server, or distributed through a network. It is not essential for memory 1102 to be physically distinguishable from processing system 1101, as they are merely illustrated as separate blocks for purposes of invoking common conceptions of how computing systems operate. Routing system 1104 could be the internal routing system of a single work station, a LAN, a WAN, a wired or wireless network, the Internet, or any other system capable of routing signals. User interface system 1105 could be a work station, a computer, a mobile phone or other mobile device, or any computing device or group of computing devices capable of receiving inputs from a single user or group of users. FIG. 9 should also not be taken to indicate that the invention can only involve design environments or design programs that may only be accessed by one user as there could be multiple users 1103 and that group of multiple users 1103 could access the design environment using any number of routing systems 1104. Those users could also access the design environment simultaneously.

While the specification has been described in detail with respect to specific embodiments of the invention, other embodiments are within the scope of the claims. It will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims.

The invention claimed is:

1. A computer-implemented method, wherein each step is conducted using a processor and a memory, the method comprising:
   during an interaction session of a user with an interactive graphical design, recording: (i) a sequence of document object model events occurring in the interaction session; (ii) a sequence of current variable values; and (iii) window size and adaptive view information, the recording resulting in a recorded sequence of document object model events and data;
   automatically generating a first set of images of the interactive graphical design by capturing images in the first set of images when triggered by respective ones of the events in the recorded sequence of document object model events, wherein each of the images in the first set of images represents a state of the interactive graphical design following a respective one of the document object model events;
   producing documentation for the interactive graphical design comprising an arrangement of descriptions of respective ones of the document object model events ordered according to the recorded event sequence and respective ones of the images from the first set;
   automatically creating a second set of images of a modified version of the interactive graphical design by applying the recorded sequence of document object model events and data to a rendering engine and without retrieving images from image buffers storing display versions of the interactive graphical design; and
   in the documentation for the interactive graphical design, automatically updating respective ones of the images from the first set with corresponding ones of the images from the second set to provide updated documentation.

2. The computer-implemented method of claim 1, wherein the generating is performed automatically during the interaction session.

3. The computer-implemented method of claim 1, further comprising playing the recording with respect to the interactive graphical design, wherein the generating is performed automatically during the playing.

4. The computer-implemented method of claim 1, wherein the generating comprises automatically generating a respective image of the interactive graphical design for each recorded event in the interaction session that alters the appearance of the interactive graphical design.

5. The computer-implemented method of claim 1, further comprising playing the recording with respect to the modified version of the interactive graphical design, wherein the creating is performed automatically during the playing.

6. The computer-implemented method of claim 1, wherein the producing further comprises:
   based on user input, identifying which of the images to exclude from the documentation; and
   automatically modifying the arrangement to produce the documentation without the identified images.

7. The computer-implemented method of claim 6, wherein the identifying comprises determining which of the events to exclude from the documentation based on user input, and automatically identifying ones of the images corresponding to the determined events as the images to exclude from the documentation.

8. The computer-implemented method of claim 1, wherein each description in the arrangement of descriptions of respective ones of the events is generated automatically based on at least one user input to a design tool used to generate the interactive graphical design.

9. The computer-implemented method of claim of claim 1, wherein the recording comprises recording the descriptions of respective ones of the events.

10. The computer-implemented method of claim 1, wherein the recording comprises recording descriptions of actions following respective ones of the events, and the producing comprises incorporating descriptions of respective ones of the actions in the documentation.

11. The computer-implemented method of claim 1, wherein the producing comprises:
   automatically creating a presentation of descriptions of the events and the images in the arrangement;
   receiving user input specifying one or more configuration options; and
   modifying the presentation according to the one or more specified configuration options to produce the documentation for the interactive graphical design.

12. The computer-implemented method of claim 11, wherein the updating comprises applying at least one of the one or more specified configuration options to the updated documentation.

13. The computer-implemented method of claim 11, wherein one of the specified configuration options is a modification applied to a particular one of the images in the first set; and the updating comprises applying the modification with respect to a respective particular one of the images in the second set that updated the particular one of the images in the first set while providing the updated documentation.

14. The computer-implemented method of claim 13, wherein the modification comprises a transformation of the particular one of the images in the first set.

15. The computer-implemented method of claim 13, wherein the modification comprises a highlight superimposed on the particular one of the images in the first set.

16. The computer-implemented method of claim 1, further comprising:
   providing a user interface showing a graphical representation of the documentation, a list comprising respective ones of the event descriptions, and user-selectable configuration options for modifying the documentation.

17. The computer-implemented method of claim 16, wherein the user-selectable configuration options comprise controls for designating respective ones of the event descriptions to exclude from the documentation; and further comprising, responsive to user-selection of a particular one of the controls, removing the event description designated by the particular control from the documentation.

18. At least one non-transitory computer-readable medium having computer-readable program code embodied therein, the computer-readable program code which, when executed by computer apparatus, causes the computer apparatus to perform operations comprising:

during an interaction session of a user with an interactive graphical design, recording: (i) a sequence of document object model events occurring in the interaction session; (ii) a sequence of current variable values; and (iii) window size and adaptive view information, the recording resulting in a recorded sequence of document object model events and data;

automatically generating a first set of images of the interactive graphical design by capturing images in the first set of images when triggered by respective ones of the events in the recorded sequence of document object model events, wherein each of the images in the first set of images represents a state of the interactive graphical design following a respective one of the document object model events;

producing documentation for the interactive graphical design comprising an arrangement of descriptions of respective ones of the document object model events ordered according to the recorded event sequence and respective ones of the images from the first set;

automatically creating a second set of images of a modified version of the interactive graphical design by applying the recorded sequence of document object model events and data to a rendering engine and without retrieving images from image buffers storing display versions of the interactive graphical design; and in the documentation for the interactive graphical design, automatically updating respective ones of the images from the first set with corresponding ones of the images from the second set to provide updated documentation.

* * * * *